April 28, 1959 R. E. TAYLOR 2,883,876
FAST IDLE CONTROL SYSTEM FOR POWER MACHINERY
Filed May 14, 1954 4 Sheets-Sheet 1

INVENTOR.
ROSS E. TAYLOR
BY
Wilson, Redrow, and Haines
ATTORNEYS.

April 28, 1959        R. E. TAYLOR        2,883,876

FAST IDLE CONTROL SYSTEM FOR POWER MACHINERY

Filed May 14, 1954        4 Sheets-Sheet 2

INVENTOR.
Ross E. Taylor
BY Wilson, Redrow, and Gaines
ATTORNEYS

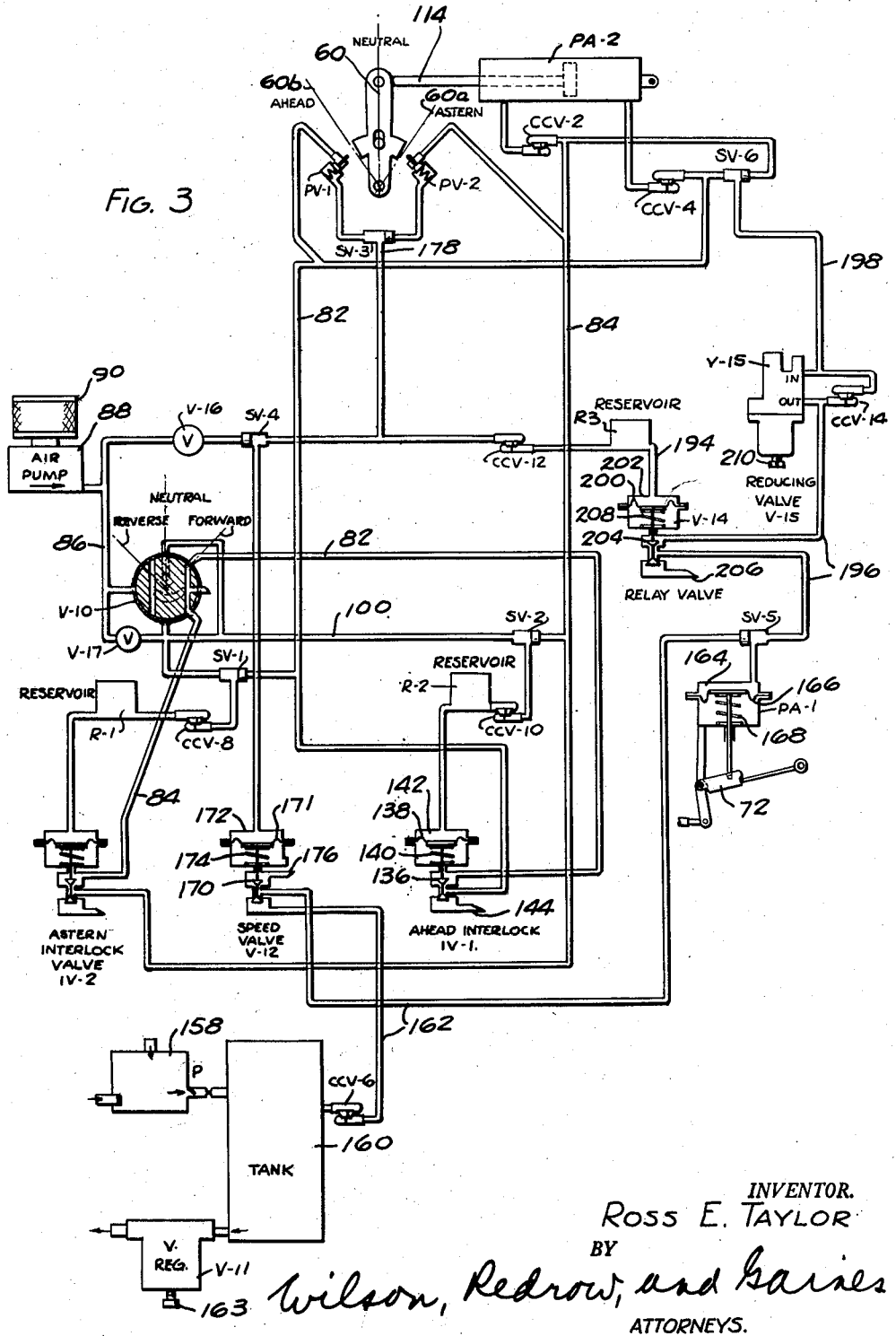

April 28, 1959 — R. E. TAYLOR — 2,883,876
FAST IDLE CONTROL SYSTEM FOR POWER MACHINERY
Filed May 14, 1954 — 4 Sheets-Sheet 4

INVENTOR.
ROSS E. TAYLOR
BY Wilson, Redrow, and Gaines
ATTORNEYS.

United States Patent Office 2,883,876
Patented Apr. 28, 1959

2,883,876

FAST IDLE CONTROL SYSTEM FOR POWER MACHINERY

Ross E. Taylor, Grosse Pointe Farms, Mich., assignor to Studebaker-Packard Corporation, a corporation of Michigan Application May 14, 1954, Serial No. 429,939

5 Claims. (Cl. 74—472)

The present application relates to a power actuated automatic control system for power machinery, for instance marine propulsion machinery, and particularly relates to a pneumatic control system for controlling a load-driving power engine and reversible transmission unit which under all conditions automatically advances the engine speed to a fast idle while deliberately delaying for a short period the process of transmission engagement into either of its forward or reversely driving statuses from neutral and which at the same time under all conditions deliberately delays for a similarly short period any change in status of the transmission from its condition of engagement in one direction to engagement in the opposite direction so as to permit the inertia of the load to slow down and thus minimize the resulting shock on the engine while so idling fast. A resulting feature of the invention herein presented is that engine stalling upon application of load is thereby eliminated as a practical matter regardless of the initial speed status of either the engine, the transmission, or the load immediately prior to the ultimate condition of engagement assumed by the transmission.

One or more hitherto known control systems for marine propulsion machinery have been arranged to provide automatically for transmission delay and engine speed advance under special circumstances to prevent engine stalling but these arrangements have generally evidenced a decided disadvantage for failure to recognize the commonly occurring necessity for advancing the engine speed automatically to fast idle immediately prior to the initial transmission engagement following engine warm up and also the necessity for advancing to fast idle during the transition in changing at reduced throttle from transmission egagement in one direction to transmission engagement of the opposite direction.

An object of the present invention is to provide an engine and transmission automatic control system which overcomes all of the foregoing failings and disadvantages leading to engine stalling and which automatically brings the engine to fast idle whenever any change of engagement is occasioned in the transmission that might momentarily overload a throttled down engine to a point that it would stall.

Another object is the provision of an engine and transmission control system as defined in the preceding object, in which a stream of pressure fluid, for instance air, is utilized in an idling speed advancing mechanism to advance the engine speed temporarily during movement of the transmission into engaged position and in which a disabling release mechanism is incorporated to over-control the idling speed advancing mechanism and prevent a speed increase above normal engine idling speed during return movement of the transmission to neutral from an operating position, where a speed increase is not only unnecessary but undesirable.

A further object is to provide an automatic engine and transmission control system which relieves the motor man or engine operator from the tediousness and necessity of having to delay his physical actions in completing the change of the transmission control from one position into another while he allows for the rotating machinery constituting the load to desirably slow down in speed and which permits the operator to be free for giving his attention to other matters after reversing the transmission for instance, with the full realization that load slow-down and temporary engine speed up will be automatically accomplished to prevent engine stalling upon reverse application of the load.

A further object of the invention is to provide in a control system having servo mechanism for controlling engine power and speed and having transmission servo mechanism for controlling the sense or direction in which the load is driven, a pneumatically operated engine power adjusting device for controlling the power servo mechanism and a second device for over-controlling the normal speed adjusting operation during circumstances wherein the normal speed adjustment is not appropriately suited to changes taking place simultaneously due to operation of the transmission control servo mechanism.

Further features, objects, and advantages will either be specifically pointed out or become apparent when for a better understanding of the invention, reference is made to the following written description taken in conjunction with the accompanying drawings, in which:

Figure 3 is a diagrammatic view of the piping circuit of the present fast idle control system;

Figures 4 and 5 are sectional views of the master control valve of the system of Figure 3;

Figure 10 is a chart showing illustrative operating positions of the engine and transmission during changes in the control system.

Figure 1:
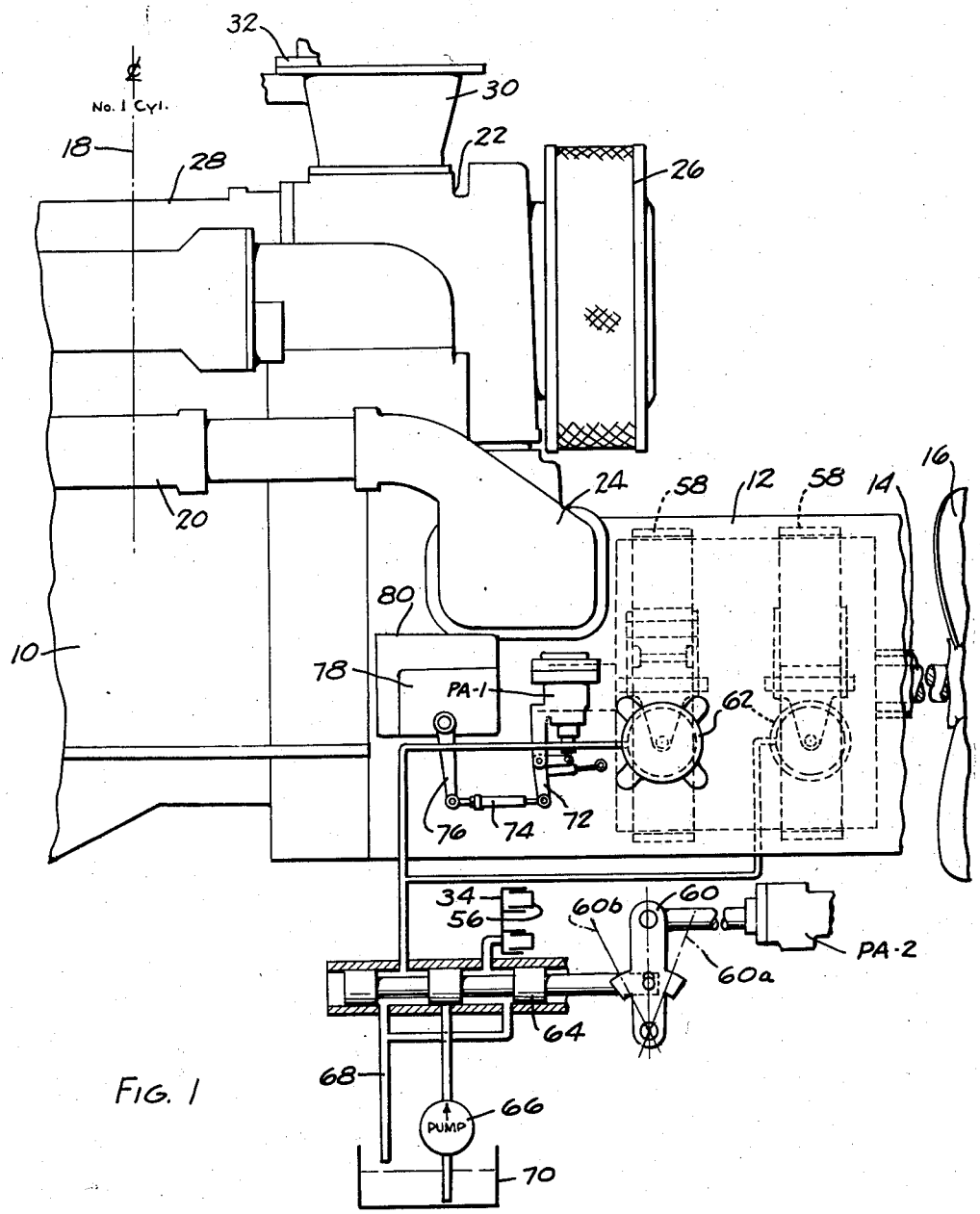
Figure 1 is illustrative of a combined engine and transmission unit in which the present fast idle control system may be embodied.

In Figure 1, one example of power machinery is illustrated which includes an engine 10 and a forward and reversely driving planetary gear type transmission 12 driven thereby. The transmission 12 in turn drives a load represented by a set of marine line shafting 14 and a left handed marine propulsion screw or propeller 16. Only a portion of the engine 10 is shown which happens to be of a V-type twelve cylinder construction of which the center line of the No. 1 cylinder of both the left and right banks is indicated at 18. The twelve cylinders of the engine 10 are supercharged being fed compressed fresh air from a pair of individual intake manifolds 20 on each side fo the engine supplied from the centrifugal compressor component of a turbo charger unit 22 through a compressed air outlet elbow 24. A wire mesh screen and silencer 26 is mounted to the mouth of a fresh air intake for the turbo charger unit 22 which latter is driven by a waste gus turbine component supplied with waste gas from an exhaust manifold 28 which serves the exhaust ports of the individual cylinders of the engine 10. The waste exhaust gases are utilized by the waste gas turbine and discharged thereby and collected in an exhaust conduit 30 and the thus spent gases are discharged upwardly through an appropriate discharge conduit 30 and stack connected muffler indicated at 32.

The following is given as an example of relative operating speeds of the engine 10 under contemplation:

Engine stall speed 300 r.p.m.
Engine normal idle speed 800 r.p.m.
Engine fast idling speed, 1200–1400 r.p.m.
Maximum speed, 2000 r.p.m. @ 600 H.P. full power output.

Figure 2:
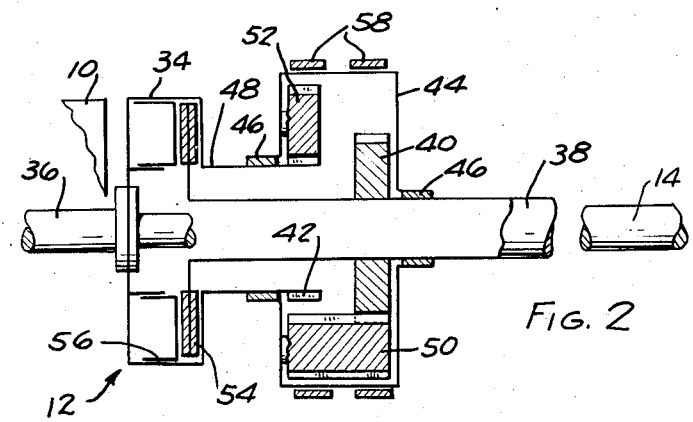
Figure 2 is a schematic representation of the transmission component of Figure 1.

The forward and reversely driving planetary type transmission 12, best seen schematically in Figure 2, has a rotatable input clutch housing 34 driven by a main crank shaft indicated at 36 in the engine 10. A transmission output shaft 38 adapted to be drivingly connected to the load-providing propeller line shafting 14 has an output sun gear 40 which is rotatively fast thereto and which is of a relatively larger diameter than an input sun gear 42 which is made rotatively fast to the rotatable input clutch housing 34. A rotatable reaction drum type pinion carrier 44 is set to rotate upon a pair of bearings 46 disposed one at each end thereof which pilot the drum carrier 44 for independent relative rotation with respect to the output shaft 38 and with respect to a reduced portion 48 of the clutch housing 34 on which the smaller input sun gear 42 is rotatively affixed. The reaction drum 44 carries sets of paired cluster gears or pinions, preferably three sets by number, each pair of which comprises a mutually enmeshing long pinion 50 and a short pinion 52, the former being enmeshed with the larger sun gear 40 and the latter being enmeshed with the small or input sun gear 42. Rotation of any one paired cluster gear of the three sets mentioned causes conjoint rotation of its companion gear in the pair but in an opposite sense so as to produce a reversal of rotation necessary for reversing of the sense of rotation of the planetary gear transmission 12.

Mechanism may be provided for selectively forwardly and reversely driving the transmission output shaft 38 through the engine driven planetary transmission 12.

Illustrative of one example of forward driving mechanism is a clutch friction disc 54 and a drum mounted pressure actuated clutch piston 56 which present mutually confronting friction engaging surfaces more completely described in the co-pending Horton and Lucia application Serial No. 383,274 filed September 30, 1953 and assigned to the assignee of the present application. As briefly described however, the clutch disc 54 is splined to the output shaft 38 of the transmission 12 and upon being engaged by the drum mounted clutch piston 56 causes the transmission 12 to be locked up and the input and output shafts 36, 38 to rotate together in a common direction in unison. For a fuller understanding of the operation of the friction engaging clutch surfaces, reference may be had to the co-pending application Serial No. 383,274 of Horton and Lucia just noted.

An illustration of one example of reversely driving mechanism is provided by the external cylindrical surface of the reaction drum 44 and a pair of brake bands 58 which encircle the same so as to present mutually confronting friction engaging surfaces generally of the character completely described in the noted co-pending application Serial No. 383,274. Engagement between the stationary brake-bands 58 and the reaction drum 44 during time at which the clutch disc 54 is unengaged will cause the drive path to be transmitted from the input shaft 36, through the smaller sun gear 42 and the clusters gear 52 and 50 with a consequent reversal in the sense of rotation, and finally to the larger sun gear 40 and the output shaft 38 so as to cause the shafts 36 and 38 to rotate in opposite directions from one another at a resulting gear reduction ratio numerically equal to the relationship between the respective diameters of the smaller sun gear 42 and the larger sun gear 40.

A pneumatically controlled transmission power actuator indicated at PA–2 in Figure 1 controlled in a manner hereinafter more fully set forth, is used as a servo-mechanosm to control the position of a transmission shift lever 60 having a neutral position as shown in solid lines in Figure 1 and having an astern position 60a indicated in dotted lines to the right in Figures 1 and 3 and an ahead position 60b as indicated in dotted lines to the left in Figures 1 and 3. The transmission control lever 60 is used for selectively powerizing either the clutch piston 56, Figure 1, to engage the clutch 54 of the transmission 12 or a pair of brake applying pistons 62 which control the application of the pair of brake bands 58 for reverse driving of the line shafting 14 through the transmission 12. The mutually exclusive operating characteristics of the transmission control lever 60 are more fully set forth in the noted co-pending application 383,274 relating to the associated hydraulic control circuit which briefly includes a spool type valve 64 which is connected for movement with and assumes a position corresponding to the position of the lever 60 and which serves selectively to direct a stream of pressure fluid from a hydraulic pump 66 to either set of the pistons 56 or 62 while at the same time connecting the other set to a drain line 68 which drains into a wet sump or reservoir 70 for supplying the intake side of the pump 66. A pneumatically controlled engine power actuator indicated at PA–1 in Figures 1 and 3 is arranged to position a swinging bell crank 72 which through an appropriate adjustable link 74 controls a power and speed setting lever 76 mounted to the engine 10. The power lever 76 in a gasoline type engine installation may be arranged to control a throttle directly or to control a governor which in turn controls the throttle but preferably in connection with the engine 10 which is of the diesel type, the power lever 76 controls a governor 78 which in turn controls a bank of adjustable output fuel injection pumps 80 for serving the individual ones of the various engine cylinder injection nozzles (not shown) in known manner.

In one physically constructed embodiment of the invention, speed-responsive governor 78 was a Woodward PSG type which as classified under the broad category of General SG governors is covered in a bulletin No. 04003 published in November 1944 by the Woodward Governor Company of Rockford, Illinois. In customary fashion the governor 78 is adjusted to predetermined speed settings by the lever 76 to maintain the speed of the engine 10 within fairly close speed limitations or fluctuations by controlling the amount of fuel handled by the nozzle pumps depending on the rack adjustment of the fuel injection pumps 80.

The following is given as an example of the relative pressures existing in the engine power actuator PA–1 as pneumatically controlled to set the governor 78 for the predetermined speeds desired:

|  | P.s.i. air pressure |
|---|---|
| Engine normal idle speed | 10 |
| Engine fast idle speed | 20 |
| Engine full power speed | 45 |

In Figures 3, 4, 5, 6, 7, 8, and 9 of the drawings a pressure actuated, preferably pneumatic, control system for operating the power actuators PA–1 and PA–2 for controlling the engine and transmission respectively in Figure 1 is shown. The system includes a master control valve, V–10 of the construction of Figures 4 and 5 for selectively pressurizing the transmission control power actuator PA–2 best seen in Figure 6 through a pair of separate opposed air conduits 82, 84 in which a pair of check choke valves CCV–2, CCV–4 is interposed having the general construction according to Figures 7 and 8. The master control valve V–10 is connected at one side to an air conduit 86 supplied from a source of pressure 88 differing from atmospheric and preferably constituted by a pneumatic discharge or air pump having an intake filter screen and silencer 90. The regulated pressure maintained by the air pump 88 may be of the order of 75 p.s.i. gage. The valve V–10 is rotatably positionable and has different sets of passages formed therein disposed in two separate planes, the first plane of passages being relatively near the observer as viewed in Figures 3 and 4 and the second plane of passages being remote to the observer and incorporating a set of passages therein best seen in Figure 5. The passages of the first plane include a straight transverse passage 92 which in the ahead or forward position of the rotatable valve V–10 serves to interconnect the valve inlet conduit 86 and the conduit 82 leading to one end of the transmission power actuator PA–2 and in the opposite or astern position of the rotatable valve element in the valve V–10 the straight transverse passage 92 serves to interconnect the valve inlet conduit 86 and the conduit 84 connected to the opposite end of the power actuator PA–2. The transverse straight passage 92 within the first plane of passages in the valve V–10 has a companion T-shaped passage 94 spaced apart therefrom which in the position corresponding to the ahead position of the valve V–10 interconnects through the base of the T and upper arm thereof the just noted actuator connected conduit 84 and a vent 96 which is open to the atmosphere. In a position corresponding to the astern or reverse position of the valve V–10 the T-shaped passage 94 interconnects through the base of the T and the lower arm thereof the actuator connector conduit 82 and the vent 96. The actuator connected conduit 84 is seen to enter the left end of the power actuator PA–2 and the actuator connector conduit 82 is seen to enter the right end of the power actuator PA–2 with the result that owing to the action of the valve V–10 the opposite ends of the power actuator PA–2 are mutually exclusively vented and pressurized or pressurized and vented respectively. In the second plane of passages in the valve V–10, a generally longitudinally extending vent connected arc shaped passage 98 is shown which in either the ahead or astern position of the valve V–10 effects a connection between a pressurizable conduit 100 and the atmosphere for venting the former, and for this purpose has a pair of radially extending passages 102, 104 connected thereto. Another radially extending passage 106 in the second plane of passages of the valve V–10 is connected at one end to the pressurizable conduit 100 when the valve V–10 is in the neutral position and is connected at all times to a longitudinally extending passage 108 having a connection (not shown) to the source of air 88. Thus in the neutral position of the master valve V–10, the pressurizable air conduit 100 is connected to the source of air pressure 88 and in either of the opposite operation positions of the valve V–10, namely the ahead position or the astern position, the conduit 100 is vented to the atmosphere through the appropriate passage 102 or 106 and the arcuate vent connected passage 98 in the valve V–10.

Figure 6:
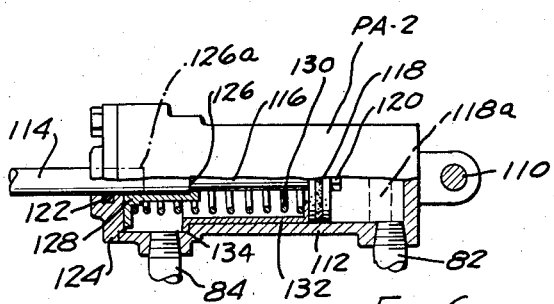
Figure 6 shows a longitudinal sectional view of the power actuator controlled by the master valve of Figure 4.

In the noted Figure 6 the details of the transmission power actuator PA–2 are best seen. The power actuator PA–2 is swingably supported at its rear end by means of a stationary pivot 110 and includes a cylinder body 112 to which the conduits 82 and 84 are connected at its opposite ends and which includes a slidably reciprocating piston rod 114. The piston rod 114 is of tubular construction and is connected to the transmission control lever 60 at one end and has an opposite end portion 116 of reduced diameter which is threadably received within a seal carrying piston 118 and secured thereto as by a nut 120. The main body of the piston rod 114 is sealed as at 122 to a cover 124 for the cylinder body 112 and at the junction thereof with the reduced portion 116 defines a shoulder 126 engaged by the flanged end of a spring seat sleeve 128. An elastic member 130 such as a helical centering spring seats at one end on the inner one 128 of a pair of spring seat sleeves of which the outer one is indicated at 132 and has a flange which engages an inner shoulder 134 formed in the wall of the cylinder body 112. The coil spring 130 in conjunction with the inner and outer spring seat sleeves 128, 132 serves as a spring centering device for the piston and rod 114 and 118 in the following manner. When the piston rod 114 advances inwardly within the actuator cylinder 112, the shoulder 126 on the rod in engagement with the inner spring seat sleeve 128 causes the sleeve 128 to move therewith and carry with it the left hand of the coil spring 130 which under the resulting compression resists such movement and thereby continuously attempts to recenter the piston rod 114 and the piston 118 and restore the latter from a dotted line operating position indicated at 118a to the solid line neutral position shown in solid lines in Figure 6. Outward movement of the piston rod 114 from the actuator cylinder 112 as attended by a shift in the position of the rod shoulder 126 to the dotted line position 126a shown by dotted lines in Figure 6 is effected by appropriate movement of the piston 118 which is engaged to the same and moves with it. The outer spring seat sleeve 132 moves with the piston 118 thereby compressing the right end of the centering spring 130 which under compression attempts to restore the piston 118 to its solid line neutral position shown in solid lines at Figure 6. Therefore de-pressurization of both conduits 82, 84 at the opposite ends of the actuator cylinder 112 permits the spring 130 to expand and recenter the piston 118 to a neutral position corresponding to the neutral position of the clutch control lever 60 of Figure 3.

Interlock valve means included at the actuator connector conduits 82, 84 may be provided for disabling or venting each one of the two transmission actuating conduits 82, 84 while the other is being energized to operate the power actuator PA–2 for the establishment of drive through the transmission 12 in the appropriate one of the two opposite directions.

Illustrative of one example of interlock valve means is a pair of ahead and astern interlock valves IV–1 and IV–2 as seen in Figure 3. The interlock valves just named are identically controlled and are similarly connected in their respective conduits 82 and 84 and in the interest of brevity only the ahead interlock valve IV–1 will be completely described. The ahead interlock valve IV–1 has a reciprocal valve element which is vertically shiftable and formed with two vertically spaced apart beveled spools 136 thereon. The spools 136 and valve element carrying the same are under the control of a flexible diaphragm 138 which is normally spring urged upwardly by means of a spring on its lower side and which forms one side of a pressurizable valve control chamber 142. In the upper open position of the spools 136 the ahead interlock valv IV–1 provides an open valve path for pressurizing the actuator connector conduit 82 and thereby establishes free communication between the pressure supplied master control valve V–10 and the right hand of the power actuator PA–2 so as to tend to set the transmission control lever 60 in the ahead position 60b, Figure 3. Pressurization of the control chamber 142 at one side of the control diaphragm 138 causes the valve element to shift and the two spaced apart spools 136 to interrupt the communication of pressure to the actuator connected conduit 82 and reconnect the actuator connected portion thereof to an atmosphere connected vent 144 on the valve IV–1 in a manner whereby the right end of the transmission power actuator PA–2 is vented and caused to be recentered into its solid line neutral position by the action of the centering spring 130 previously considered.

Figures 7, 8:
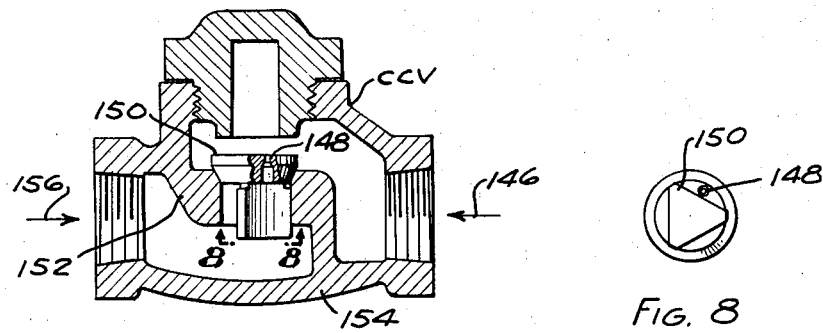
Figures 7 and 8 are side sectional and bottom plan views respectively of the type flow choke valves appearing in Figure 3.
Figure 9:
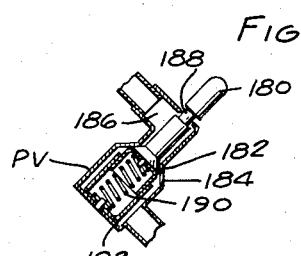
Figure 9 is a longitudinal sectional view of a pilot valve appearing in Figure 3.

In Figures 3, 7 and 8, the check choke valves CCV–2 and CCV–4 of the general form of the valve CCV are respectively arranged for only restrictively filling the opposite ends of the transmission power actuator PA–2 during air flow in a direction thereto but unreservedly venting the same through a wide open path at the time at which air is being exhausted from the appropriate one of the two opposite ends of the transmission power actuator cylinder PA–2. Thus for normal filling flow of air in the direction indicated by an arrow 146 in Figure 7 toward the power actuator PA-2, the check choke valve CCV presents a restricted calibrated orifice 148 formed in a poppet type check element 150 which detachably seats upon the margins of the opening provided in a transverse partition 152 extending across the inside of the body 154 of the check choke valve CCV. During venting operation of the transmission power actuator PA-2, however, which causes air flow in the direction of an arrow 156 in Figure 7, the poppet type check element 150 is caused to unseat upwardly and accommodate the free flow of air away from the appropriately exhausting end of the transmission power actuator PA-2 and rapidly exhaust the same. In one physically constructed embodiment of the invention the exhaust stroke of the pressure movable piston 118 to neutral was practically instantaneous whereas pressure movement of the piston 118 from neutral to an operating position required about one second's time due to the one way action of the flow choking check choke valves CCV-2, CCV-4.

Means is provided according to the invention to supply modulated air to the speed controlling power actuator PA-1 to vary the engine power and speed.

Illustrative of one form of a modulated air source is a device 158 in Figure 3 for creating pressure differing from the atmosphere and preferably positive compressed air pressure. The device 158 is a pneumatic discharge pump which discharges compressed air into a reservoir tank 160 which through an appropriate check valve CCV-6 of the general type of Figure 7 restrictively supplies a control conduit 162 connected to the speed control power actuator PA-1. The tank 160 has a constant pressure inlet regulator valve V-11 connected thereto and provided with a threadably adjustable valve setting element 163 which in a schematic sense represents a manual speed setting device for the engine 10.

The following is given as an example of the speed setting preset pressures maintained in the tank 160 through appropriate adjustment of the adjustable element 163.

Normal engine idling speed, 800 r.p.m, 10 p.s.i
Fast idling speed 1200–1400 r.p.m, 20 p.s.i.
Full power maximum speed (2000 r.p.m.), 45 p.s.i.

The foregoing regulator-modulated pressures made available from the tank 160 are conducted into a control chamber 164 in the actuator PA-1 of which a diaphragm 166 forms one side of the chamber. The control diaphragm 166 is flexible and is normally urged upwardly by a return spring 168 which tends in its uppermost position to pull the bell crank lever 72 into an upper normal engine idling speed position and which is exactly counterbalanced in this position by a pressure of 10 p.s.i. in the control chamber 164. The conduit 162 connected between the tank 160 and the speed control power actuator PA-1 includes a speed interlock valve V-12 therein which has two vertically spaced apart beveled spool elements 170 which are similar in construction to the spool elements 136 of the interlock valves IV-1 and IV-2 already considered. A flexible diaphragm 171 in the upper portion of the speed valve V-12 defines the bottom side of a control chamber 172 and is urged continually upwardly by means of a return spring 174 continuously tending to cause the spools 170 to interconnect a vent 176 and that portion of the conduit 162 which is connected to the speed controlling power actuator PA-1. Pressurization of the control chamber 172 in the speed valve V-12 causes a downward shift of the spools 170 so as to close off the connection of the vent 176 leading to the atmosphere, and so as to establish free communication through the conduit 162 between the tank 160 and the speed controlling power actuator PA-1.

Means according to the invention are provided to actuate the speed valve V-12 automatically at appropriate times to force the spool elements 170 thereof into their downward position so as to establish free communication between the tank 160 and the speed controlling power actuator PA-1.

Illustrative of one example of such speed valve actuating means is a pair of transmission lever actuated pilot valves PV-1, PV-2 included in a conduit having a common downstream portion 178 and separate intake portions on the outer sides of the valves and respectively supplied from the actuator connected conduits 82, 84. The pilot valves PV-1 and PV-2, best seen for their general internal construction according to Figure 9, include a protruding valve carrying plunger 180 which is engaged by the transmission control link 60 whenever it assumes either one of its opposite operating positions. The valve carrying plunger 180 has an enlarged inner end forming a valve which in its seated position loosely fits on a seat 182 within the body 184 of the valve PV so as to permit a predetermined amount of air leakage into a chamber 186 which is connected to atmosphere through a restrictive vent or bleed formed between the body 184 and a relieved portion 188 in the shank of the plunger 180. When the plunger 180 is depressed the latter leakage is forthwith interrupted owing to the fact that the relieved portion 188 of reduced diameter is advanced inwardly to a position within the chamber 186 and the enlarged inner end portion of the plunger 180 moves inwardly off its seat and opens to permit free passage of air through the pilot valve PV. A return spring 190 and a pair of mutually telescoping guide cups 192 cooperate to urge the plunger 180 continuously to return to its upper venting position. Thus both of the pilot valves PV-1 and PV-2 are free from engagement with the transmission control lever 60, a controlled leakage tends to be permitted from within the common downstream conduit portion 178 and also from within the actuator connected conduits 82 and 84 and in such instance the speed valve control chamber 172 collapses under the action of the spring 174 so as to vent the control conduit 162 connected to the speed controlling power actuator PA-1.

Means according to the invention is provided for preventing the venting of the conduits 82, 84 by the action of the unengaged pilot valves PV-1 and PV-2.

Illustrative of one example of such venting preventing means is a pair of double check or shuttle valves SV-1 and SV-2 which are included between the pressurizable conduit 100 and the control chambers for the interlock valves IV-1 and IV-2, for instance the control chamber 142. At those times at which the master valve V-10 is disposed in the neutral position and the pilot valves PV-1 and PV-2 are unengaged, a stream of air provided by the air-source-connected passage 106 through the master valve V-10, Figure 5, causes the conduit 100 to be pressurized and as a result both of the shuttle valves SV-1 and SV-2 are shifted to the rightward permitting the control chambers of the interlock valves IV-1 and IV-2 to be pressurized so as to position the valve spools 136 downwardly and cause both ends of the transmission power actuator PA-2 to be vented as at 144.

Means according to the invention are provided to insure a supply of air to the control chamber of the speed valve V-12 regardless of which one of the pilot valves PV-1 and PV-2 is engaged to open position while the appropriate conduit 82, 84 is pressurized and while the other of the valves PV-1, PV-2 is simultaneously unengaged and venting.

Illustrative of one example of such means is a shuttle valve SV-3 which is interposed in the common portion 178 of the downstream conduit for the pilot valves and which assumes a rightward position when the pilot valve PV-1 is engaged and opened by the transmission control lever 60 and which assumes a leftward position when the pilot valve PV-2 is engaged and opened by the lever 60. In either case the shuttle valve SV-3 isolates the unengaged vented valve from the common downstream portion 178 in the system and connects the open valve thereto the exclusion of the vented valve.

Over-controlling means may be provided for manually causing disengagement of the transmission 12 and permitting adjustable engine speeds regardless of the position of the master control valve V–10.

Illustrative of one example of such manually operated over-controlling means is the pair of shuttle valves SV–1, SV–2 operating in conjunction with another shuttle valve SV–4 and a pair of manually operatable valves V–16 and V–17 which are disposed in adjacency with and connected to the source of air differential pressure 88. The valves V–16 and V–17, being normally closed, are arranged such that when manually opened the latter valve, V–17 pressurizes the conduit 100 and thus forces the shuttle valves SV–1 and SV–2 into a rightward position so as to vent both ends of the transmission power actuator PA–2 through simultaneous actuation of the ahead and astern interlock valves IV–1 and IV–2. The pressurization of the conduit 100 is augmented and facilitated under these circumstances at such times at which the master control valve V–10 happens to be in neutral position. Even when the valve V–10 is in an operating position so as to tend to vent the conduit 100 through the valve passages 102, 104 it nevertheless is still the case that the valve V–17 when opened can gradually cause sufficient pressure to accumulate in the conduit 100 to simultaneously actuate the interlock valves IV–1 and IV–2, the pressure build up being due to the internal friction and resistance to flow inherent in the noted valve passages 102, 104 and the axial vent 98 in the master valve V–10. On the other hand the manually controlled valve V–16 is connected to the control chamber of the speed valve V–12 through the shuttle valve SV–4 and when opened causes the latter valve SV–4 to be shifted to the rightward so as to pressurize the control chamber 172 of the speed valve V–12, thereby directly interconnecting the speed controlling power actuator PA–1 and the source of modulated air 160 whereby the engine 10 is adjusted to a speed corresponding to the pressure setting of the tank 160 as preset by the manual adjusting element 163 on the pressure regulator valve V–11 connected to the tank 160.

Shift delay means for automatically preventing re-engagement of the transmission from one direction to the other for a period of approximately 7 seconds may be provided according to the present invention so as to permit the rotating machine elements 14, 16 constituting the load on the engine and transmission to have an opportunity to slow down in speed before the transmission is so re-engaged as to cause a reversal of rotation of the output shaft 38 of the same.

Illustrative of one example of shift delay means is a pair of air reservoir chambers R1 and R2 which are connected in series with a pair of respective check choke valves CCV–8 and CCV–10 between the corresponding control chamber for each of the interlock valves IV–1 and IV–2 and the shuttle valves SV–1 and SV–2 just noted. Additionally, the shift delay means prevents establishment of engagement of the transmission 12 for a period of 7 seconds when the controls are operated to shift the transmission lever 60 from neutral to either of its opposite positions 60a or 60b, as for instance in the circumstance that the actuator connected conduit 82 is appropriately under pressure due to action of the ahead interlock valve IV–1 when occupying an upward position to cause the transmission to assume an ahead position from neutral. The resulting pressure in the conduit 82 causes the shuttle valve SV–1 to be shifted to the leftward and the compressed air conducted therethrough is freely admitted through the unseated check choke valve CCV–8 and the reservoir R–1 so as to pressurize the control chamber of the astern interlock valve IV–2 and cause the free venting of the reverse end of the transmission power actuator PA–2 through the unseated check choke valve CCV–2 and the conduit 84 served by the astern interlock valve IV–2. Accordingly, when a subsequent change is made in the position of the valve V–10 to assume the reverse position, pressure from the conduit 100 now temporarily pressurized by the valve V–10 in passing through neutral position causes the shuttle valve SV–1 to shift to the rightward and immediately there following the valve V–10 takes its reverse position as intended, venting the reservoir R–1 through the check choke valve CCV–8 and the vent connected passage 104 in the second plane of passages in the valve V–10 of Figure 5. The restrictive action of the now seated check choke valve CCV–8 in only gradually bleeding off the pressure from the reservoir R–1 is such that for approximately 7 seconds the control diaphragm in the astern interlock valve IV–2 is held downwardly under air pressure against the return spring therebelow and after expiration of the seven-second period the diaphragm moves upward so as to open up the valve passage in the valve IV–2 and establish free communication in the conduit 84 connected to the left end of the cylinder of the transmission power actuator PA–2 thereby shifting the transmission lever 60 into the astern position 60a desired. By similar reasoning it will be seen that a seven-second delay will be occasioned in the operation of the ahead interlock valve IV–1 when the transmission control valve V–10 is moved from either the neutral or reverse position into the ahead or forward position for pressurizing the conduit 82 between the ahead interlock valve IV–1 and the right end of the transmission power actuator PA–2 for shifting the transmission lever 60 into the ahead position 60b.

Means are provided according to the invention for advancing the engine idling speed from normal idle to fast idle during a transition in the condition of the transmission 12 from neutral to either one of its opposite operating positions.

Illustrative of one example of such means is a relay valve V–14 which is connected to the pilot valves PV–1, PV–2 through a conduit 194 supplied from the common downstream portion 178 of the pilot valves, and also a pressure reducing valve V–15 having a conduit on one side thereof at 196 connected to the speed controlling power actuator PA–1 and having a conduit 198 on the upstream side thereof supplied from the actuator connected conduits 82, 84 alternatively. Similarly to the interlock valves IV–1, IV–2 and to the speed valve V–12, the relay valve V–14 is provided with a flexible controlled diaphragm 200 defining one side of a control chamber 202 and further is provided with a pair of vertically spaced apart beveled spool valve parts 204 which are forced due to pressurization of the control chamber 202 to assume a downward position so as to connect the actuator connected portion of the conduit 196 and a vent 206 open to the atmosphere. A return spring 208 in the relay valve V–14 tends to move the diaphragm 200 and the spaced apart spool parts 204 into an upward position whereby the vent 206 is isolated from the system and wherein the relay valve V–14 provides a free path interconnecting the portions of the conduit 196 so as to establish free communication between the reducing valve V–15 and the speed controlling power actuator PA–1. The relay valve V–14 thus automatically controls the pressurization of and the venting of the speed controlling power actuator PA–1 with respect to the reducing valve V–15 which happens to be of orthodox construction and which has a threadably adjustable element 210 for producing a downstream pressure of approximately 20 p.s.i. in the conduit 196 connected to the speed control power actuator PA–1. At all times at which the control chamber 172 in the speed valve V–12 is pressurized, so also the control chamber 202 in the relay valve V–14 is pressurized to cause the latter to vent the power actuator PA–1 and allow control of the same to be under the operation of the speed valve V–12 and the modulated air source 160. It occurs that the speed valve V-12 however is depressurized when the transmission control link 60 is moved from either one of its opposite engaged positions to neutral as previously noted and on such occurrence, the return spring 174 in the speed valve V-12 causes the spool parts 170 to shift upwardly to vent the speed control power actuator PA-1 and substantially simultaneously the relay valve V-14 is vented to move the spools parts 204 thereof upwardly and interconnect the speed controlling power actuator PA-1 and the reducing valve V-15 so as to apply the 20 p.s.i. downstream pressure of the latter to the control diaphragm 166 of the speed controlling power actuator PA-1 to set the engine speed at fast idle provided, however, that the power actuator PA-2 is simultaneously being pressurized at one end or the other to shift the transmission.

Means are provided at the intersection between the conduits 162, 196 according to the invention for mutually excluding the downstream pressure from the speed valve V-12 and from the relay valve V-14 one from the other, especially when either is venting.

Illustrative of one example of such mutually excluding means is a double check or shuttle valve SV-5 having a slidable shuttle element which always moves in position toward the vented one of the two conduits 162 or 196 when the other of the two conduits is pressurized; accordingly the control chamber 164 of the speed controlling power actuator PA-1 may be connected to either one but not both of the tank 160 and the pressure reducing valve V-15.

Valve means according to the invention are provided to insure an instantaneous supply of air to the reducing valve V-15 regardless of which of the actuator connected conduits 82, 84 is being pressurized during the one second's delay period thereof in forcing air through the check choke valves CCV-2 and CCV-4 as appropriate to shift the transmission power actuator PA-2 while the other of the conduits 82, 84 is simultaneously being exhausted.

Illustrative of one example of such valve means is a shuttle valve SV-6 operating in conjunction with the check choke valves CCV-2 and CCV-4 which are connected to opposite sides of the shuttle valve SV-6. In operation, when the conduit 82 is pressurized at 45 p.s.i. as already described so as to slowly bleed pressure through the check choke valve CCV-4 for progressively applying pressure to the ahead end of the transmission power actuator PA-2 during the noted one-second's lag period, the shuttle valve SV-6 is shifted to the right and the reducing valve V-15 is pressurized at 45 p.s.i. upstream pressure, and at the same time, the counterpart conduit 84 and the unseating check choke valve CCV-2 will unrestrictedly exhaust air from the left or astern end of the transmission power actuator PA-2.

Means are provided according to the invention for momentarily delaying a reduction from the fast idle speed to normal idle level following the immediate engagement of the transmission 12 into one of its two opposite drive positions.

Illustrative of one example of such momentary delay means is a reservoir R-3 and a check choke valve CCV-12 which are connected in series between the relay valve connected conduit 194 and the common portion 178 of conduit leading from the two pilot valves PV-1, PV-2. The just noted check choke valve CCV-12 is of the general CCV form according to Figure 7 but is reversely arranged so as to readily depressurize the control chamber 202 in the relay valve V-14 for rapidly producing a fast idle setting for the speed controlling power actuator PA-1 whereas during reverse flow the check choke valve CCV-12 only restrictively charges the reservoir R-3 and the controlling chamber 202 in the relay valve V-14 for only gradually shifting the spool parts 204 thereof downwardly and venting the conduit 196 and permitting the speed controlling power actuator PA-1 to be moved out of its fast idle position. The latter restrictive pressurization is for the purpose of assuring a momentary continuance of the fast idle throttle advance after the transmission reversal has taken place, the momentary continuance being for a time sufficient to allow engine speed recovery to fast idle speed under the newly assumed load.

Means according to the convention are provided for disabling the fast idle speed advance mechanism during a transition in the transmission 12 wherein it is being returned to a neutral position from one of its opposite operating positions and wherein an advance to fast idle is not only unnecessary but undesirable.

Illustrative of one example of such disabling means is a check choke valve CCV-14 for by-passing the reducing valve V-15; the check choke valve CCV-14 is of the general form of the valve CCV of Figure 7, being arranged to unseat and permit free venting of the upstream conduit 196 connected to the reducing valve V-15 at all such times at which the upstream conduit 198 thereof is being vented due to the fact that the interlock valves IV-1 and IV-2 are in their downward venting position, and the transmission power actuator PA-2 is depressurized at both ends. Otherwise the check choke valve CCV-14 is seated and provides a restricted bleed by-pass around the reducing valve V-15 so as to only a slight degree to modify the action thereof which normally tends to reduce the pressure 45 p.s.i. in the conduit 198 down to the desired downstream fast idle pressure of 20 p.s.i. in the conduit 196. A brief comparison in the operation of the transmission in its path of going from neutral to either forward or reverse and in its path of going from either forward or reverse to neutral is as follows: In the latter instance the check choke valve CCV-14 unseats upwardly to prevent engine acceleration to fast idle despite the attempt of the relay valve V-14 (up position) to introduce all or any remaining part of the normal 20 p.s.i. downstream pressure from the reducing valve V-15 into the speed controlling power actuator PA-1; such unseating of the check choke valve CCV-14 does not occur when the transmission is in process of effecting a path from neutral and which in such case the pressurization of the lines 198 and 196 takes place prior to the one second's expiration time required to cause the engagement of the transmission 12 in one positon or another due to the delayed pressurization and operation of the transmission power actuator PA-2.

For a more complete understanding of the cycle of operation of the pneumatic controls of Figure 3 reference may be had to the Figure 10 in the drawings. The transmission transition from neutral to forward illustrated in the first three lines in the chart of Figure 10 is essentially the same as the transition from neutral to reverse and for the sake of brevity, only the phases of the transition to forward are completely shown. The transition from forward to reverse, lines three through seven inclusive in Figure 10, is essentially the same as the transition from reverse to forward and likewise for the sake of brevity, the forward to reverse transition only is shown according to Figure 10. Similarly the transition from either operating positions to neutral, for instance, from reverse to neutral according to lines 7 through 9 of Figure 10 is the same in principle and only the transition from reverse is specifically shown, step by step, in the interests of brevity.

The chart of Figure 10 is believed to be self-explanatory but by way of a brief summary as to operation, it may be noted that in the system including the transmission power actuator PA-2 of Figure 3, whenever compressed air is introduced through either of the conduits 82 or 84 to an appropriate side of the actuator PA-2 this air must pass through the appropriate one of the check choke valves CCV-2 or CCV-4 and is therefore restricted in its passage so as to slow down the speed of servo action of the transmission power actuator PA-2 for a period of delay of about one second's duration. Simultaneously, and specifically at a point within this period of delay, air is introduced to the reducing valve V–15 through the shuttle valve SV–6 and the downstream air from the reducing valve V–15 passes through the conduit 196 held open by the vented relay valve V–14 and into the speed controlling power actuator PA–1 to advance the speed of the engine to a fast idle corresponding to the regulator setting of 20 p.s.i. set by manually adjustable element 210 on the reducing valve V–15. At the thus described restricted rate, the transmission power actuator PA–2 gradually moves the clutch control lever 60 to an extreme position at which it engages one or the other of the ahead or astern pilot valves PV–1, PV–2 for simultaneously introducing air under pressure both to the control chamber 172 of the speed valve V–12 and to the control chamber 202 of the relay valve V–14 so as to vent that portion of the portion of the fast idle conduit 196 which is connected to the speed controlling power actuator PA–1 and bleed off the pressure of the latter through the vent 206 in the relay valve V–14 and restore control over the actuator PA–1 to the speed valve V–12 and in case the latter is energized at 10 p.s.i. or less, the engine speed reduces to the normal idle setting as urged by the actuator return spring 168.

As herein described, the present control invention is embodied in a pneumatic type system employing compressed air as the actuating fluid. It is evident that a vacuum type system could be equally well employed with certain modifications and conceivably a hydraulic system might be employed to equal advantage in certain circumstances. So, also the drawing shows an arrangement of ahead and astern interlock valves IV–1 and IV–2 which automatically provides for seven-second's delay not only in going from one position of the transmission to the opposite position, but also in going initially from neutral to an operating position, but the latter delay may not be necessary, in all instances, and self-evidently the delay mechanism in going initially from neutral to an operating position may be dispensed with in some instances and self-evidently the interlock valve delay mechanism may be disabled as by use of the expedient of a simple by-pass valve such as the check choke valve CCV–14 which by-passes the reducing valve V–15 under specified conditions. The pneumatic control system as presently disclosed is applied to a characteristically diesel engine having a speed controlling governor but the control system is not limited to diesel engines of this character and may be applied to equal advantage in throttle controlled gasoline engine installations with or without having a governor mechanism therefor.

Variations within the spirit and scope of the invention described are equally comprehended by the foregoing description.

What is claimed is:

1. A control system including a pair of pressure movable servo devices for operating an engine source of prime power having speed controlling mechanism therefor and having reversible transmission controlling mechanism therefor, said speed controlling mechanism acting in dependence on the first servo device and together having corresponding shiftable positions comprising a closed position for normal idle speed, a predetermined initially open position for fast idle speed, and a fully open power position, said reversible transmission control mechanism acting in dependence on the second servo device and together having corresponding shiftable positions including a neutral position and opposite forward and reverse drive positions, a fluid pressure source, a selector valve, a first conduit connecting said source to said selector valve, said selector valve having a plurality of pressure outlets, a pair of second conduits joining said pressure outlets to said second servo device for selectively effecting drive positions, pressure responsive interlock valve means interposed in said second conduits, said interlock valve means being normally pressurized to close the said second conduits, third conduit means interconnecting said selector valve and said interlock valves for supplying pressure for opening of one of said interlock valves for transmission of pressure fluid therethrough to said second servo device to effect a change in drive position, first delay means interposed in said third conduit means to delay the opening of said interlock valves, second delay means interposed in said second conduits to delay change in drive position, fast idle means effective during the delay caused by said second delay means for directly applying a first pressure to said first device to shift said device to a predetermined fast idle position.

2. The combination of claim 1 having pilot valve means connected to said second conduits and opened upon movement of said second servo device to its end position, a relay valve actuated by pressure supplied by said second conduits through said pilot valve means to overrule the fast idle means by preventing the application of said first pressure, and a third delay means operative between said pilot valve means and said relay valve means to delay said overrule.

3. The combination of claim 1 having bypass means responsive to vent said first servo device when said interlock valves close said pair of second conduits.

4. A control system including a pair of pressure movable servo devices for operating a source of prime power having speed control mechanism therefor and having transmission control mechanism therefor, said speed control mechanism acting in dependence upon the first servo device and together having corresponding shiftable positions including a predetermined initially open position, said reversible transmission control mechanism acting in dependence upon the second servo device and together having corresponding shiftable drive positions, a fluid pressure source, first and second conduits connecting said source to said second servo device, first and second interlock valves interposed in said conduits, delay means interposed in said first and second conduits to effect a predetermined interval of delay to permit pressure flow from said interlock valves progressively to said second servo device to shift the same to a drive position, a third conduit interconnecting said first servo device and said first and second conduits, fast idle means effective during said interval of delay for applying a first pressure to said first device to shift the same to a predetermined initially open position, said fast idle means comprising a pressure-reducing valve interposed in said third conduits, said fast idle overrule means comprising valve means responsive to attainment of a drive position by said second servo device to vent the first pressure on said first servo device to permit shift of same away from the predetermined initially open position.

5. The combination of claim 4 comprising a modulated fluid pressure source, fourth conduit means interconnecting said first servo device and said modulated fluid pressure source, and means responsive to the venting of the first pressure to apply said modulated pressure to said first servo device.

References Cited in the file of this patent
UNITED STATES PATENTS

| | | |
|---|---|---|
| 2,388,357 | Hewitt | Nov. 6, 1945 |
| 2,426,064 | Stevens | Aug. 19, 1947 |
| 2,524,487 | Stevens | Oct. 3, 1950 |
| 2,622,402 | Moulton | Dec. 23, 1952 |